Patented Jan. 29, 1935

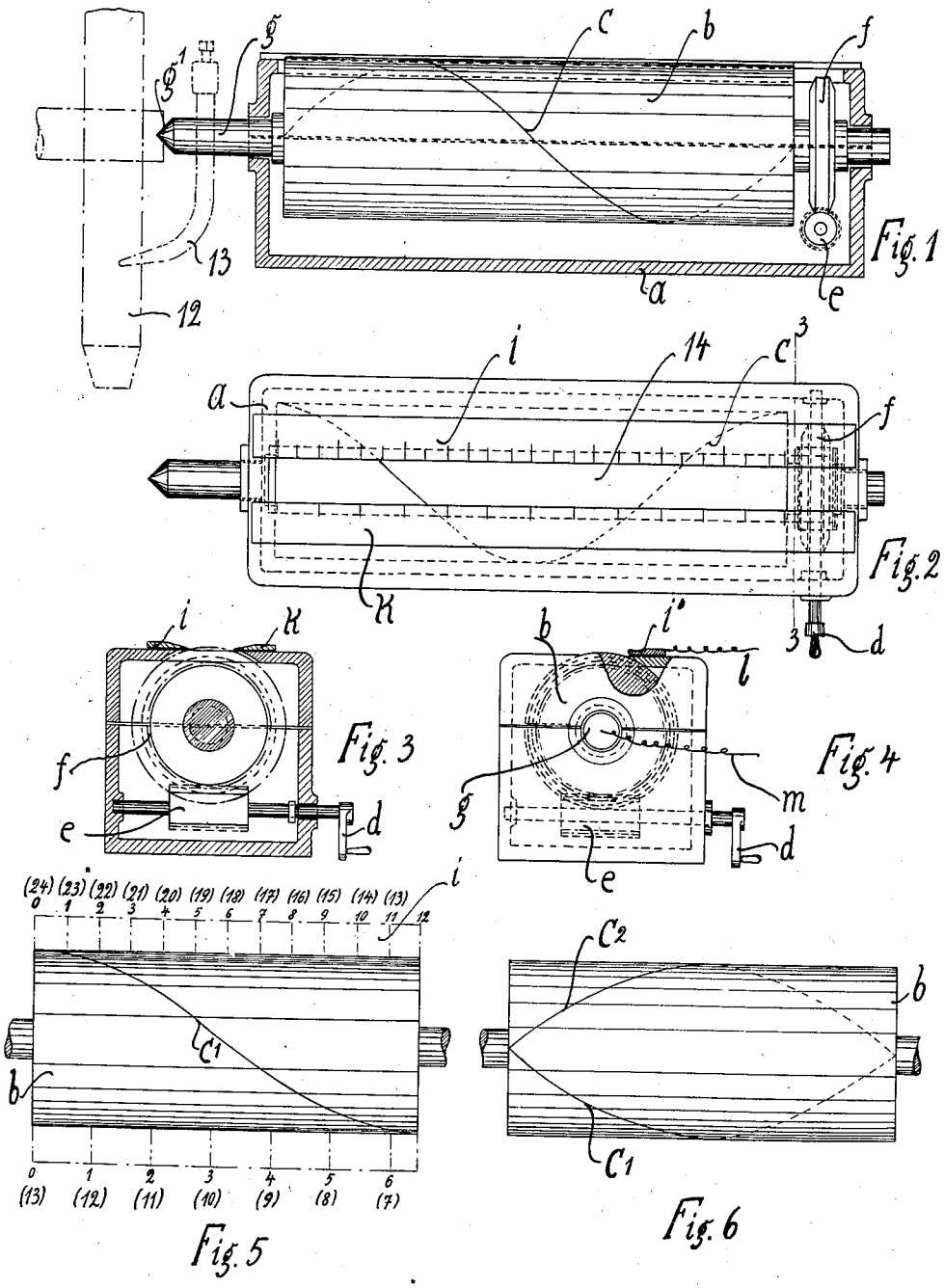

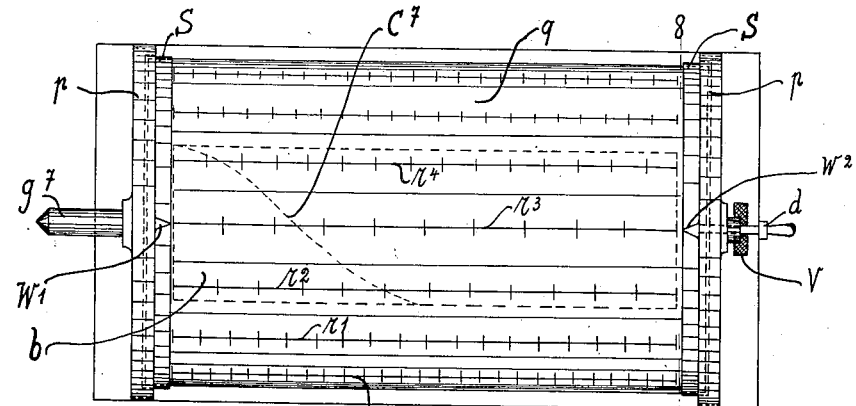
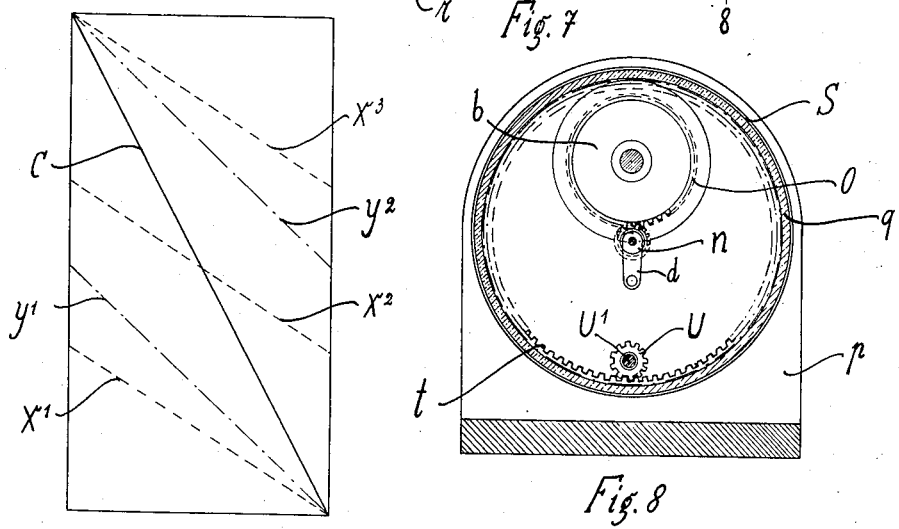
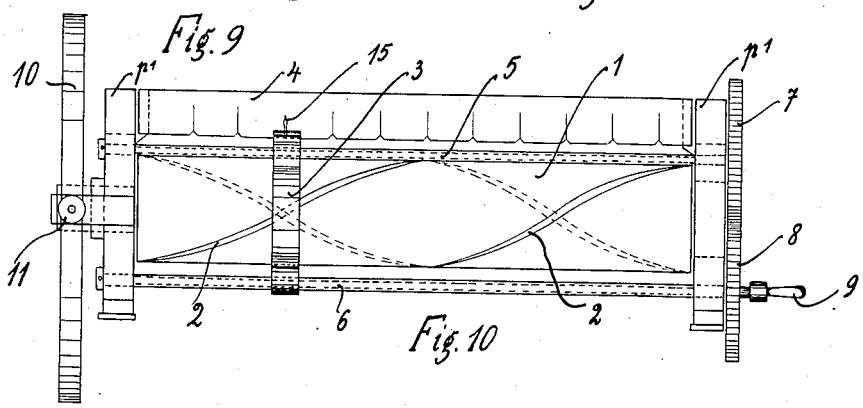

1,989,396

UNITED STATES PATENT OFFICE 1,989,396

APPARATUS FOR DIVIDING CURVED SURFACES

Wilhelm Bohne, Gelsenkirchen, Germany

Application September 4, 1929, Serial No. 390,236
In Germany October 19, 1928

11 Claims. (Cl. 33—19)

My invention relates to improvements in apparatus for dividing the circumference of a circle or a cylinder into sections of equal length, and the object of the improvements is to provide an apparatus by means of which the said circumference can be divided into any number of equal sections prior to the milling or cutting of the cylinder. With this object in view my invention consists generally in connecting the body carrying the said circle or cylindrical surface with a cylinder so that both parts can be rotated in unison, the said cylinder having a helical line drawn thereon and cooperating with a rectilinear scale disposed parallel to the cylinder in position for being passed by the helical line when rotating the cylinder, and carrying scale marks dividing the same into equal parts. Thus, when rotating the cylinder and the body connected therewith and arresting the same whenever one of the scale marks intersects the helical line, a mark can be produced on the said body for dividing the same into equal sections corresponding to the scale marks.

My invention more particularly relates to means for dividing the peripheral surface of gear wheels, milling machines, boss pulleys, cam pulleys, reamers, circular saw bodies and the like, into even sections for forming teeth or serrations on the periphery thereof. My invention furthermore may be used in connection with the universal edging machine. The periphery of the wheel or cylinder body is divided or spaced into any desired number of equal parts previous to their cutting to form a product of the desired type having teeth of any specified pitch or depth.

For the purpose of explaining the invention several examples embodying the same have been shown in the accompanying drawings in which the same reference characters have been used in all the views to indicate corresponding parts.

In said drawings,

Fig. 1 is a sectional elevation showing the dividing apparatus, the body to be divided being shown in dotted lines, Fig. 2 is a top plan of Fig. 1, Fig. 3 is a sectional elevation taken on the line 3—3 of Fig. 2, Fig. 4 is an elevation looking from the right in Fig. 1 and illustrating a modification, Figs. 5 and 6 are elevations of the cylinder showing a modification, Fig. 7 is a top plan view of a cylinder showing another modification, Fig. 8 is a sectional elevation taken on the line 8—8 of Fig. 7, Fig. 9 is a development of a cylinder of a modified form, and Fig. 10 is a top plan view showing another modification.

The apparatus illustrated in Figs. 1 to 3 comprises a casing $a$ of rectangular cross-section, and a cylinder $b$ rotatably mounted within said casing and carrying a helical line $c$, the said line being produced thereon by any known or preferred process. The helical line $c$ is drawn all around the cylinder, so that the ends thereof are disposed on a straight line parallel to the axis of the cylinder $b$. The spindle $g$ of the cylinder $b$ is adapted to be coupled with the body to be divided, such as a gear wheel and the like shown in dotted line of Fig. 1 of the drawings. The said body consists for example of a disk 12 mounted on a centre $g'$ formed on the spindle $g$, and a clamp dog 13 being provided for rotating the body 12 in unison with the cylinder $b$. The cylinder is adapted to be rotated by means of a worm gear $f$ secured to the spindle $g$ and a worm $e$ meshing therewith.

The top wall of the casing $a$ is formed with a longitudinal slot 14 through which a part of the cylinder is visible. The top wall of said casing contains a pair of replaceable scales $i$ and $k$ secured thereto. Said scales are provided with marks or spaced divisions extending the length of the helical line $c$ on cylinder $b$ to form equal sections. The said scales are removably secured to the top wall of the casing, and the scale marks are drawn to the ends of the scales and close to the surface of the cylinder $b$, so that exact readings may be made.

In the operation of the apparatus the cylinder $b$ is intermittently rotated into the positions in which the successive scale marks intersect the helical line $c$, and the said positions are marked on the body 12 by means of a suitable stationary tool.

At the beginning of the rotation of the cylinder the first scale mark intersects one of the ends of the helical line, and after a complete rotation the last scale mark intersects the opposite end of the helical line. While rotating the cylinder the change from one scale mark to the next one corresponds to a definite angle of rotation of the body, and if the scale marks are equal distances apart, as is shown in Fig. 2, the body is intermittently rotated through equal angles, and equal arcs are divided out on the body by the marking tool.

In Fig. 4 I have shown a modification in which electrical means are provided for marking the body. The cylinder and the scale $i'$ are made of insulating material, and the cylinder $b$ carries a metallic helical line. The individual scale marks of the scale $i'$ are provided with brushes. The said brushes and the metallic helical line carried by the cylinder $b$ are connected by leads $l$ and $m$ with a source of electric energy and an electrically operated marking apparatus adapted to produce marks on the body whenever a brush representing a scale mark engages the helical line $c$. The electric marking apparatus may include for example an electromagnet. Further, the circuit may include an apparatus for producing an optical signal.

In the modification shown in Figs. 5 and 6 the cylinder $b$ is formed with sectional helical lines $c^1$ and $c^2$ ascending in opposite directions and each covering one half of the circumference of the cylinder. Thus the length of the cylinder $b$ and the scales is reduced to one half, and the scale marks cooperate each with both sections of the helical line. When rotating the cylinder in one direction through an angle of 360°, the sectional helical lines $c^1$ and $c^2$ are successively intersected by the scale marks. During the first half of the rotation of the cylinder the sectional helical line $c^1$ cooperates successively with the scale marks from 0 to 12, and when continuing the rotation of the cylinder, the scale marks are engaged by the helical line in the opposite succession, the said scale marks being indicated in Fig. 5 by the numerals 13 to 24.

If it is desired to divide the circle by means of the drum shown in Figs. 5 and 6 into an uneven number of sections, there is no scale mark on the scale at the end of the helical line $c^1$, and the said line ends beyond the last scale mark a distance equal to one half of the distance of the scale marks.

In Figs. 7 and 8 I have shown a modification by means of which the circle can be divided into different numbers of sections, for which purpose a plurality of differently graduated scales are combined on a common carrier such as a cylinder adapted to be set with any one of the scales into operative position. The said cylinder may be disposed beside the drum carrying the helical line or lines so that any of the scales can be brought into position by rotating the drum. In a modification the scales are disposed on an endless band or a hollow cylinder surrounding the drum carrying the helical line or lines. In this case the cylinder must be made from transparent material, or it must be formed with longitudinal slots having the scale marks provided along the said slots.

The apparatus shown in Figs. 7 and 8 comprises a rotary drum $b$ shown in Fig. 7 in dotted lines. The said drum carries a helical line $c^7$, and its axis $g^7$ is rotatably mounted on side members $p$ of the frame. The drum is adapted to be rotated by means of a crank $d$ secured to the spindle of a pinion $n$ meshing with a toothed rim $o$ of the drum $b$. On the side members $p$ a cylinder $q$ is rotatably mounted, which cylinder is made of glass and has different scales $r$, $r^1$, $r^2$, $r^3$, $r^4$ etc. engraved thereon. At its ends the glass cylinder is fixed to rings $s$ carrying toothed rims $t$ engaged by pinions $u$ fixed to a common shaft $u^1$ adapted to be rotated by means of a button $v$ fixed thereto. By turning the cylinder by means of the button $v$ any one of the scales $r$ provided on the cylinder $q$ can be brought into operative position and between marks $w^1$ and $w^2$ provided on the side members $p$. If desired in lieu of the marks $w^1$, $w^2$ means are provided for locking the cylinder in set position. Preferably the scales $r$, $r^1$ etc. comprise longitudinal lines, as is shown in Fig. 7, in order to facilitate setting of the curve $c^7$ relatively to the scale marks.

By means of the apparatus shown in Figs. 7 and 8 the circle can be divided into a large number of different sections, because a large number of scales $r$ can be provided on the cylinder $q$. The number may be further increased by providing on the drum $b$ a set of sectional helical lines, as is shown in Fig. 9 representing a development of the drum. In addition to the helical line $c^7$ extending around the whole circumference of the drum the said cylinder or development carries two sets $x$ and $y$ of sectional helical lines, each section extending around a fraction only of the circumference. Thus the set of sectional helical lines $x$ comprises three sections $x^1$, $x^2$ and $x^3$ each extending around one third of the circumference of the drum. The section $x^1$ begins at the zero line of the development which is a longitudinal line of the drum, and it ends at the end of the first third of the circumference of the cylinder. The second section $x^2$ begins at a point away from the said zero line a distance equal to the distance between the end of the sectional line $x^1$ from the zero line, and it ends at the end of the second third of the circumference. The distance between the end of the section $x^2$ and the zero line is equal to the distance between the beginning of the third sectional line $x^3$ and the zero line, and the third sectional line $x^3$ ends in the zero line. When using the sectional helical lines $x^1$, $x^2$, $x^3$ the scale set into operative position is three times intersected by the said sectional helical lines when once rotating the drum, and therefore, the number of the sections of the circle is three times that obtained when using the same scale in cooperation with the helical line $c^7$. In a similar way the number of the divisions of the circle is doubled when using the sectional helical lines $y^1$, $y^2$.

In Fig. 10 I have shown a modification in which in side members $p^1$ two screw-threaded spindles 5 and 6 are rotatably mounted which engage in internally screw-threaded eyes of a transverse member 3 carrying a lug engaging in grooves 2, 2 formed on the drum 1. The transverse member 3 carries a hand 15 travelling along a scale 4. The spindles 5 and 6 are connected by gear wheels 7 and 8, and the spindle 6 carries a crank 9. The spindles 5 and 6 have respectively right and left screw-threads. Thus, when rotating the spindles 5 and 6 by means of the crank 9 the transverse member 3 travels in one or the other direction while rotating the drum 1 and the body 10 connected therewith. The section lines may be marked on the body 10 by means of a marking device 11 carried by one of the side members $p^1$ of the frame.

It will be noted that the invention relates to a laying out or dividing device which is used for dividing circular or cylindrical bodies into any number of arcs or sections.

As an example of the operation of the device, a workpiece 12 is mounted in connection with spindle $g$ and held firmly by means of the clamp dog 13 so that both cylinder $b$ carrying helical curve $c$ and body 12 will rotate together. Every time the cylinder $b$ is rotated so that curve $c$ coincides with a graduation on scales $i$, a mark is made on the surface of the workpiece 12 by an indicating device 11 such as that shown in Fig. 10, or in any well-known manner whereby the cylindrical surface of the workpiece is divided into any desired number of arcs or sections. The marks forming the different spacings are then used to guide the cutting or milling operation to obtain a product of the desired type.

From the foregoing description taken in connection with the drawings, it will be noted that the device made in accordance with my invention is adapted for efficiently and accurately setting spaces or sections on the peripheral surface of a cylindrical or other curvate body prior to milling or cutting to form throughout serrations or depressions thereon.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. An apparatus for circumferentially dividing a body into sections, comprising a rotary member adapted to be connected with said body for rotation in unison therewith and carrying a spiral, and a scale extending parallel to the axis of said rotary member and having equally spaced scale marks cooperating with the spiral for indicating predetermined movement or angular displacement of said body.

2. An apparatus for circumferentially dividing a body into sections, comprising a rotary member adapted to be connected with said body for rotation in unison therewith and carrying a spiral uniformly ascending circumferentially along said member, and a rectilinear scale extending parallel to the axis of said rotary member and having equally spaced scale marks located in position for indicating predetermined movement or angular displacement of said body.

3. An apparatus for circumferentially dividing a body into sections, comprising a rotary member adapted to be connected with said body for rotation in unison therewith and carrying two spirals of opposite pitches, and a scale extending parallel to the axis of said rotary member and having equally spaced scale marks cooperating with said spirals for indicating predetermined movement or angular displacement of said body.

4. An apparatus for circumferentially dividing a body into sections, comprising a rotary member adapted to be connected with said body for rotation in unison therewith and carrying a spiral uniformly ascending circumferentially along said member, and a member shiftable relatively to said spiral and carrying a plurality of rectilinear scales each extending parallel to the axis of said member and having equally spaced scale marks adapted to cooperate with said spiral for indicating predetermined movement or angular displacement of said body.

5. An apparatus for circumferentially dividing a body into sections, comprising a rotary member adapted to be connected with said body for rotation in unison therewith and carrying a spiral uniformly ascending circumferentially along said member, and a rotary member shiftable relatively to said spiral and carrying a plurality of rectilinear scales each extending parallel to the axis of said rotary member and having equally spaced scale marks adapted to cooperate with said spiral for indicating predetermined movement or angular displacement of said body.

6. An apparatus for circumferentially dividing a body into sections, comprising a rotary drum adapted to be connected with said body for rotation in unison therewith and carrying a helical line, and a rotary cylinder having its axis parallel to the axis of said drum and carrying a plurality of scales parallel to said axes and divided into different sections and adapted to be rotated with any of its scales into position for cooperation with said helical line.

7. An apparatus for circumferentially dividing a body into sections, comprising a rotary drum adapted to be connected with said body for rotation in unison therewith and carrying a helical line and a rotary cylinder enclosing said drum and having its axis parallel to the axis of said drum and carrying a plurality of scales parallel to said axes and divided into different sections and adapted to be rotated with any of its scales into position for cooperation with said helical line.

8. An apparatus for circumferentially dividing a body into sections, comprising a rotary member adapted to be connected with said body for rotation in unison therewith and carrying a plurality of spirals uniformly ascending circumferentially along said member and each extending across a fraction of the circumference of said member, and a scale extending parallel to the axis of said rotary member and having equally spaced scale marks located in position for cooperating with said spirals for indicating predetermined movement or angular displacement of said body.

9. An apparatus for circumferentially dividing a body into sections, comprising a rotary member adapted to be connected with said body for rotation in unison therewith and carrying sets of a plurality of spirals uniformly ascending circumferentially along said member and each extending across a fraction of the circumference of said member, and a scale extending parallel to the axis of said rotary member and having equally spaced scale marks adapted to cooperate with said spirals for indicating predetermined movement or angular displacement of said body.

10. Apparatus for dividing the surface of bodies into segmental sections, comprising a casing having a longitudinal slot therein, a rotatable cylinder mounted in the casing and having a curved line on its face, the ascension of said line in a longitudinal direction on the cylinder being proportional to the ascension of the line thereon in a circumferential direction, a rectilinear scale on the casing abutting the longitudinal slot for cooperating with the curved line on the cylinder for setting the proper dividing lines on the surface of said bodies, and means in connection with the cylinder for operatively rotating the same.

11. In apparatus for dividing the surface of a body whose peripheral surface is to be spaced for cutting teeth or serrations thereon, the combination of a rotatable cylinder having a curved line disposed on the surface thereof so that the ends are oppositely disposed and in parallel relation with each other and with the axis of the rotatable cylinder, a scale extending parallel to the axis of said rotary member and having equally spaced scale marks for indicating predetermined movement or angular displacement of said body, and means joining said body to the cylinder for rotating both in unison to space the peripheral surface of said body.

WILHELM BOHNE.